UNITED STATES PATENT OFFICE.

PAUL HOLZACH AND ERNST PREISWERK, OF BASEL, SWITZERLAND, ASSIGNORS TO SOCIETY OF CHEMICAL INDUSTRY IN BASLE, OF BASEL, SWITZERLAND.

ALKYL SALICYLGLYCOLLATE AND PROCESS OF MAKING SAME.

No. 800,442.     Specification of Letters Patent.     Patented Sept. 26, 1905.

Application filed December 29, 1904. Serial No. 238,834. (Specimens.)

*To all whom it may concern:*

Be it known that we, PAUL HOLZACH, chemist, and ERNST PREISWERK, doctor of philosophy and chemist, citizens of the Swiss Republic, and residents of Basel, Switzerland, have invented new and useful Improvements in Alkyl Salicylglycollates and Processes of Making the Same, of which the following is a full and complete specification.

Nothing has been known hitherto relative to the applicability of esters of salicylglycollic acid in therapeutics. Senff (*Annalen* 208, page 273) described ethyl salicylglycollate as a dark oil, which he could not purify by distillation either at ordinary pressure or in a vacuum, so that he was obliged to analyze the ester in that form. The product made according to Senff's direction has, moreover, a strong odor of oil of gaultheria. In view of this undesirable odor a therapeutical application of this ester—for instance, as an external remedy for rheumatism—appeared impossible.

According to the present invention by observing certain conditions the crude ethyl salicylglycollate can be easily distilled in a vacuum to obtain a colorless and odorless crystalline mass, which by recrystallization from petroleum ether may be still further purified, and then forms colorless odorless crystals melting at 39° centigrade. However, even in this pure form ethyl salicylglycollate is not suitable for external therapeutical application, as it crystallizes on the skin. A similar objection exists to the methyl ester, which has not yet been described and is also solid, its melting-point being 29° centigrade.

By this invention a valuable product for therapeutical purposes is obtained by melting together crystallized ethyl salicylglycollate and crystallized methyl salicylglycollate. The product is a liquid which crystallizes only at temperatures below 0° centigrade, so that when externally applied to the skin it does not crystallize thereon, and in consequence it is better absorbed than either constituent alone would be. Moreover, the mixture is considerably more soluble in various solvents, such as alcohol, than either constituent is, whereby its application is facilitated.

The conditions to be observed in the preparation of ethyl salicylglycollate as compared with those laid down by Senff are that the reaction between sodium salicylate and ethyl chloracetate be conducted at a lower temperature, and that the ethyl chloracetate be in excess, or that an indifferent diluent be present. These conditions lead to smoother reaction, so that a purer product and a better yield are obtained than were obtained by Senff.

The following example illustrates the invention: One hundred and sixty parts of sodium salicylate, quickly dried and finely powdered, are heated with one hundred and sixty-two parts of dry methyl chloracetate in an oil-bath for some twenty-four hours at 160° to 170° centigrade, (temperature of bath,) the vessel being provided with a reflux condenser. When the mass has cooled, the separated sodium chlorid is filtered off and washed with benzene. The mixture is then fractionally distilled in a vacuum eventually while insufflating a gentle current of air or carbon dioxid through the mixture. The methyl salicylglycollate thus produced forms colorless crystals melting at 29° centigrade. The ethyl salicylglycollate is analogously prepared and melts at 39° centigrade.

To make a liquid therapeutical preparation these two esters are mixed in suitable proportions. For instance, a mixture obtained by melting together sixty parts methyl salicylglycollate and forty parts ethyl salicylglycollate has given good practical results.

The crystallized alkyl salicylglycollates form white crystals soluble in alcohol, benzene, ether, and castor-oil, difficultly soluble in petroleum ether, insoluble in water, and soluble in aqueous caustic alkalies. The alkyl salicylglycollates are saponified and form salicylic acid, glycollic acid, and the corresponding alcohol.

The liquid mixture of methyl salicylglycollate and ethyl salicylglycollate is at the ordinary temperature a colorless and almost odorless liquid having a density of 1.26 at 18° centigrade. This liquid is easily soluble in alcohol, ether, benzene, and castor-oil, difficultly soluble in cold petroleum ether, insoluble in water, and is decomposed by its heating with aqueous caustic alkalies into salicylic acid, glycollic acid, ethyl alcohol, and methyl alcohol.

The described alkyl salicylglycollates and their mixtures shall be employed as external remedies for rheumatism. Their application is conveniently effected in alcoholic solution or dissolved in a mixture of olive-oil and castor-oil.

What we claim is—

1. The herein-described improvements in the manufacture of chemical products for use in therapeutics, by heating sodium salicylate with excess of alkyl chloracetates, separating the sodium chlorid produced in the course of the reaction and distilling the product in a vacuum to obtain a colorless, odorless crystalline mass.

2. The herein-described improvements in the manufacture of chemical products for use in therapeutics, by heating sodium salicylate with excess of methyl and ethyl chloracetates, separating in each case the sodium chlorid produced in the course of the reaction, distilling each of the products in a vacuum to obtain a colorless, odorless crystalline mass, purifying both the crystalline mass by recrystallization to obtain crystallized pure methyl salicylglycollate and crystallized pure ethyl salicylglycollate and melting together both these alkyl salicylglycollates to obtain a therapeutical product which is liquid at the ordinary temperature.

3. As new chemical products for use in therapeutics, the described crystallized alkyl salicylglycollates forming white crystals, soluble in alcohol, ether, benzene and castor-oil, difficultly soluble in cold petroleum ether, insoluble in water, and soluble in aqueous caustic alkalies and being saponified by heating their solutions in aqueous caustic alkalies with formation of salicylic acid, glycollic acid and alcohol.

4. As a new article of manufacture, the described therapeutical product consisting of a mixture of pure methyl salicylglycollate and ethyl salicylglycollate, this mixture forming at ordinary temperature a colorless and almost odorless liquid, of a density of 1.26 at 18° centigrade, easily soluble in alcohol, ether, benzene and castor-oil, difficultly soluble in cold petroleum ether, insoluble in water and being decomposed by heating with aqueous caustic alkalies into salicylic acid, glycollic acid, methyl alcohol and ethyl alcohol.

In witness whereof we have hereunto signed our names, this 15th day of December, 1904, in the presence of two subscribing witnesses.

PAUL HOLZACH.
ERNST PREISWERK.

Witnesses:
GEO. GIFFORD,
ALBERT GRAEFER.